INVENTOR.
Perry Okey.
ATTORNEYS

May 20, 1952 P. OKEY 2,597,022
MACHINE FOR USE IN PRODUCING ONE-PIECE
MULTIFOCAL OPHTHALMIC LENS BLANKS
Filed Jan. 19, 1950 7 Sheets-Sheet 2

INVENTOR.
*Perry Okey.*
BY
*Corbett, Mahoney & Miller*
ATTORNEYS

May 20, 1952 P. OKEY 2,597,022
MACHINE FOR USE IN PRODUCING ONE-PIECE
MULTIFOCAL OPHTHALMIC LENS BLANKS
Filed Jan. 19, 1950 7 Sheets-Sheet 3

INVENTOR.
*Perry Okey.*
BY
*Corlett, Mahoney + Miller*
ATTORNEYS

May 20, 1952 P. OKEY 2,597,022
MACHINE FOR USE IN PRODUCING ONE-PIECE
MULTIFOCAL OPHTHALMIC LENS BLANKS
Filed Jan. 19, 1950 7 Sheets-Sheet 5

INVENTOR.
*Perry Okey.*
BY
*Corbett, Mahoney + Miller*
ATTORNEYS

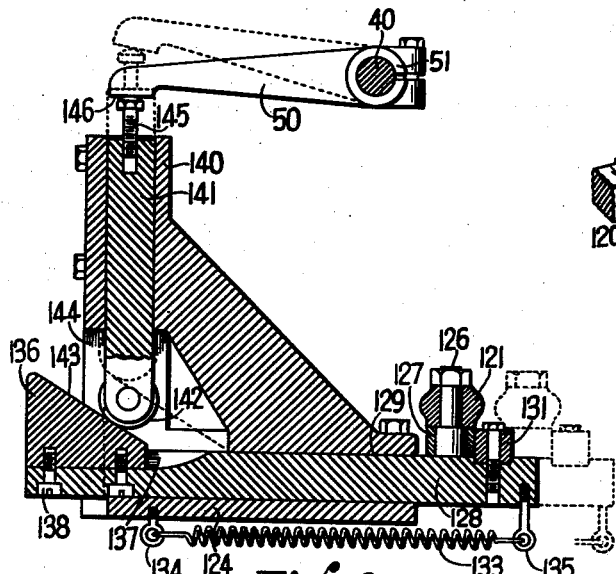
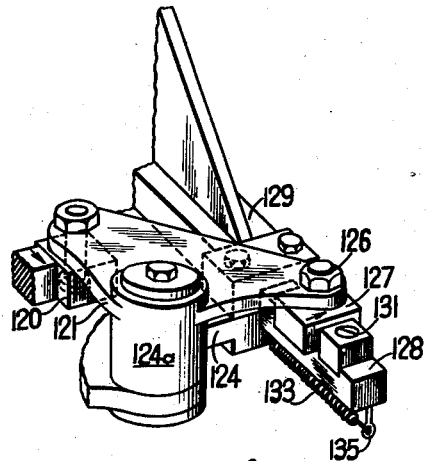
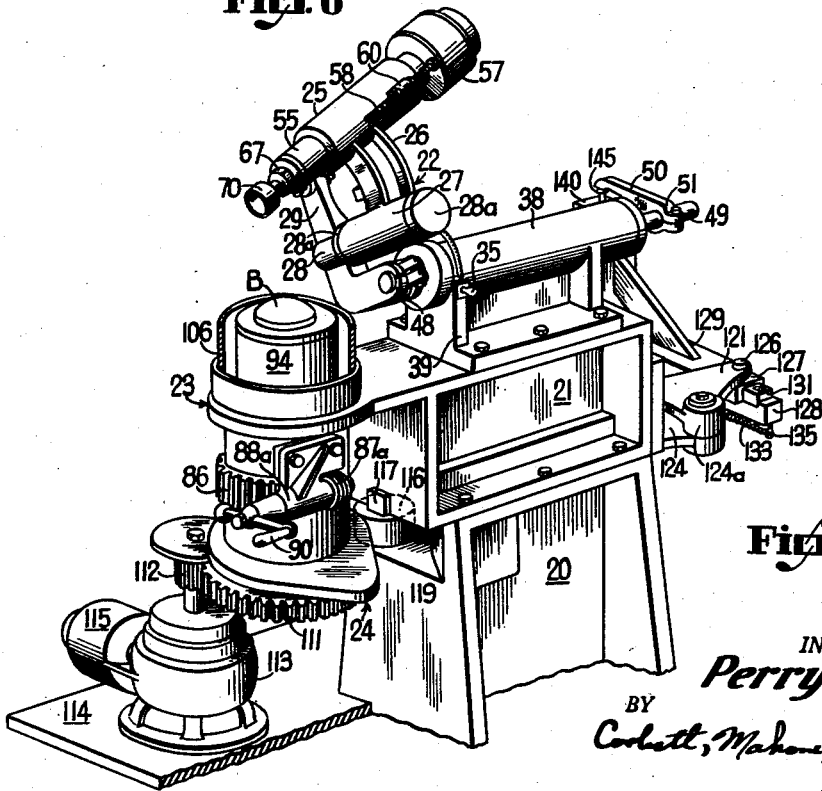
Fig. 6
Fig. 7
Fig. 8
INVENTOR.
*Perry Okey*
BY
*Corbett, Mahoney & Miller*
ATTORNEYS May 20, 1952 P. OKEY 2,597,022
MACHINE FOR USE IN PRODUCING ONE-PIECE
MULTIFOCAL OPHTHALMIC LENS BLANKS
Filed Jan. 19, 1950 7 Sheets-Sheet 7
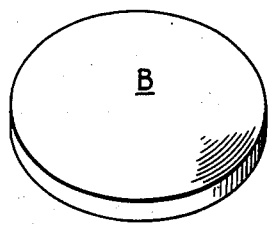
Fig. 9
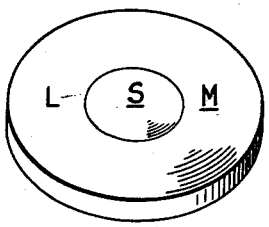
Fig. 10
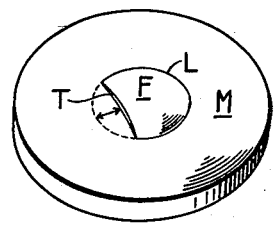
Fig. 11
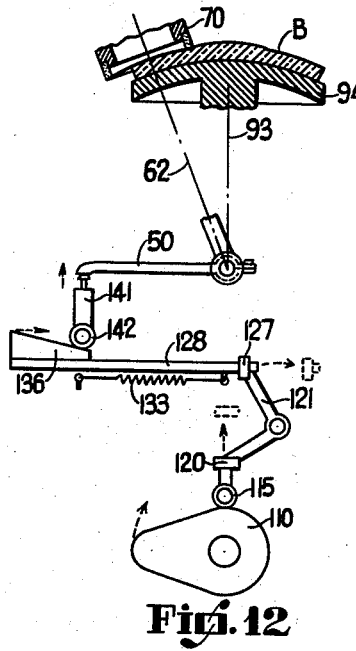
Fig. 12
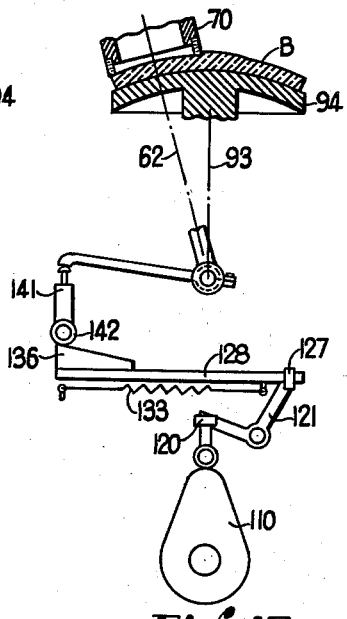
Fig. 13
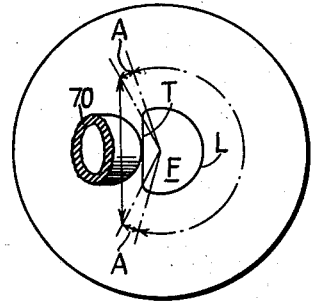
Fig. 14
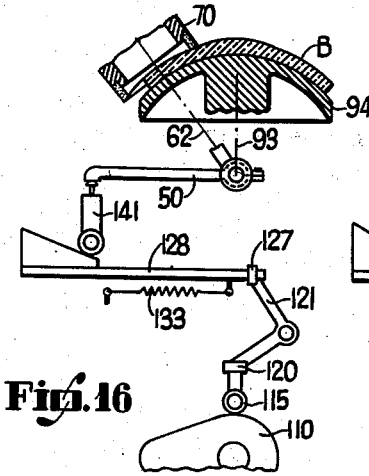
Fig. 16
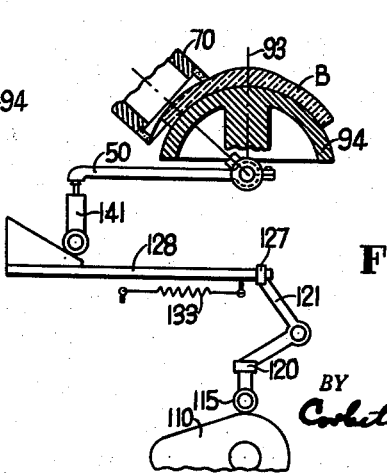
Fig. 17
Fig. 15
INVENTOR.
*Perry Okey.*
BY
*Corbett, Mahoney & Miller*
ATTORNEYS Patented May 20, 1952

2,597,022

UNITED STATES PATENT OFFICE 2,597,022

MACHINE FOR USE IN PRODUCING ONE-PIECE MULTIFOCAL OPHTHALMIC LENS BLANKS

Perry Okey, Columbus, Ohio, assignor, by direct and mesne assignments, to General Lens Co., Columbus, Ohio, a corporation of Ohio Application January 19, 1950, Serial No. 139,341

18 Claims. (Cl. 51—127)

My invention relates to a machine for use in producing one-piece multifocal ophthalmic lens blanks. It has to do, more particularly, with a machine for use in producing that type of one-piece lens blank which is provided with a segment known in the trade as a "flat-top" segment. Such a lens blank is more commonly of the bifocal type but may have more than two fields of vision.

It has been recognized for years that one of the most desirable types of bifocal lenses is a one-piece lens which consists of a major lenticular surface, commonly the distance field, which completely surrounds a minor lenticular surface, usually the reading field, which is in the form of a segment that is mainly of circular form but has a flat top. For some purposes, the segment may be at the top of the lens with the flat edge at the bottom, but the flat edge is always towards the center of the lens. In order for this type of lens to be entirely satisfactory, it is necessary that the segment merge almost indistinguishably along the curved portion of its boundary line with the major portion of the lens. Furthermore, the shoulder along the flat top, which results from the difference in curvature between the two lenticular surfaces, must be kept to a minimum height and must be free of all nicks, scratches, et cetera, which cause aberrations at the shoulder.

Many different types of methods and machines have been proposed in the past for producing a lens blank of this type. One method has suggested the completion of a lens blank with a circular segment and then the grinding off of part of the segment to form a flat top thereon. However, great difficulty has been encountered in bringing the surface of the area, exposed by removal of the top of the segment, to the exact curvature and level of the surrounding major lenticular surface and especially without damaging adjacent areas of the already formed major lenticular surface. Also, it has been found to be very difficult to remove the material and form the shoulder at the flat top without chipping, nicking, scratching, or otherwise roughening the shoulder.

I found that the above-indicated general method of forming a flat-top multifocal ophthalmic lens blank was the most desirable method of forming such a lens blank provided a machine could be devised which would in some manner remove the upper part of the segment and bring the surface so produced into continuity with the major lenticular surface without damaging it and at the same time produce a smooth surface on the small shoulder so formed so that it would be free of aberrations.

One of the objects of my invention is to provide a machine which will operate on a previously formed lens blank having a segment of one outline so as to produce a segment of different outline, the exposed area produced by such operation being brought into exact continuity with the surrounding area without damage thereto.

Another object of my invention is to provide a machine of the type indicated which is especially suitable for operation to remove the upper portion of a circular segment to form a flat top thereon, the resulting shoulder along the flat top being free of notches, nicks, deep scratches, et cetera, which might cause aberrations along such line in the finished lens.

A further object of my invention is to provide a machine which is extremely rigid and will be relatively free of vibration so that it will function with precision in removing a portion of the previously formed segment.

A further object of my invention is to provide a precision machine of the type indicated which is provided with means for setting it with micrometer accuracy so that the portion of the segment will be removed only to the level of the major surface and no more.

Still another object of my invention is to provide a precision adjustment in addition to that mentioned in the preceding paragraph which will not only result in the portion of the segment being removed to the same level as the surrounding surface but will also result in the production of a surface of the exact curvature of the surrounding surface so that the new surface produced by removing part of the segment will be a continuity and indistinguishable area of the major surface.

Still another object of my invention is to provide a machine which is readily adjustable to function on lens blanks having major lenticular surfaces of varying curvatures.

Another object of my invention is to provide a machine which is readily adjustable to function on lens blanks of various major curvatures and which includes means for ensuring that a preselected area only of the previously formed segment will be removed regardless of the major curvature of the blank.

An additional object of my invention is to provide a machine of the type indicated provided with a forming tool which is positively and accurately moved during the forming operation through a precise path without vibration or variation so as to change the outline of the previously formed segment to one of preselected form and size.

A further object of my invention is to provide a machine which, as previously indicated, is particularly suitably for forming a flat top on a circular segment and which is caused to travel and is held in a predetermined path across the top of the segment without wavering or vibration to produce a sharp shoulder free of roughness.

An additional object of my invention is to provide a machine of the type indicated which uses a fixed forming tool, as distinguished from floating laps used with prior art machines of this general nature, which greatly facilitates the accurate removal of a predetermined area of the previously formed segment and the formation of the sharp smooth shoulder at the top of the segment if a flat top segment is to be produced.

Another object of my invention is to provide a machine wherein the lens blank holder and the lens blank carried thereby may be removed from the machine and be replaced on it or an identical machine without sacrificing accuracy in the forming operation.

Additional objects will be apparent from the following description of my machine.

As indicated above, the machine of my invention is adapted to function to change the shape of a segment previously formed on a lens blank. The lens blank is usually of concavo-convex form and the segment may be formed on either the convex or concave side thereof. The segment is molded circular and my machine is particularly useful in changing the segment from a circular to a flat-top segment.

According to my invention, I provide a machine which comprises mainly a tool spindle unit and a lens blank support spindle unit. The lens blank support spindle unit is always vertically disposed and the tool spindle unit, during operation, has its axis disposed in substantially the same vertical plane as the lens blank supporting spindle. The two units are mounted on a suitable supporting frame and each is driven independently about its own axis. This independent drive is desirable because it is important that the lens blank and forming tool be driven at different relative speeds. The tool spindle unit is carried by a supporting arm which has a swingable section for moving the tool spindle unit between inoperative and cooperative positions relative to the lens blank support spindle unit so that the tool can be moved into contact with the lens blank and be maintained so during the forming operation and be moved away from the blank when the operation is completed to permit removal of the blank.

The tool spindle supporting arm is also mounted on a rocking shaft for rocking movement about a horizontal axis at right angles to the vertical axis of the lens blank support spindle and which intersects such axis. If the convex or positive side of the lens blank is to be acted upon by the tool, the said axis about which the tool rocks is below the level of the lens blank support. The said supporting arm for the tool spindle can be clamped at various angular positions around the rock shaft so that the tool spindle axis can always be in a proper angular position on the shaft so that its axis is normal to the main curvature of the lens blank. The tool spindle is adjustable axially to vary the distance of the tool from the axis about which it is rocked and this distance is adjusted to correspond exactly to the radius of curvature of the major area or lenticular surface on the lens blank.

The lens blank support spindle is adjustable axially to adjust the lens blank support vertically with precision so that the lens blank can be raised into contact with the tool and beyond this level slightly to the extent of the thickness of material at the segment which is to be removed during the forming operation, thereby lifting the tool slightly by swinging its supporting arm upwardly.

In order to rock the tool about the indicated axis, which is at the center of curvature of the curve of the major area of the blank, at regular timed intervals so as to produce a flat top on the segment, cam-controlled mechanism is provided. One of the features of my invention is that the cam is carried by the lens blank support spindle in fixed relationship thereto and it is never necessary to remove the cam regardless of the curvature of the major area of the lens to be operated upon. However, this mechanism does include means for varying the extent of the rocking movement of the tool spindle about said axis whenever the machine is to work on a lens blank of different major area curvature.

The cam being located on the lens blank support spindle is carried by a rigid substantially vibration free support and is fixed to the spindle for rotation with the lens blank support and is always maintained in the same relationship thereto. The cam imparts rocking movement to the tool spindle by means including a reciprocable slide located below the axis, about which the tool spindle rocks, and being reciprocable horizontally in a direction parallel to such axis. The slide includes a wedge member which, by contact with a suitable intermediate member, actuates a rocker arm that is connected to the tool spindle supporting arm and serves to rock it about said axis. The extent of rocking movement of the tool spindle supporting arm can be varied by removing the said wedge member and replacing it with one having a steeper or more gradual inclination. As will later appear more clearly, it is necessary to vary the extent of the rocking movement each time the machine is to operate upon a lens blank having a different major area surface curvature so that only a predetermined size area of the circular segment will be removed.

Thus, as the lens blank and tool are rotated, with the tool in contact with the blank, the forming operation will progress, the tool gradually moving into the material at the proper area so as to gradually remove it. Rocking of the tool will occur at regular intervals and to the proper extent, due to the cam-controlled mechanism, and a predetermined area of the circular segment will be gradually removed. The operation will continue until the area of the segment being removed is continuous with the surrounding major area, at which time a stop will cooperate with the tool spindle supporting arm to prevent further removal of material. At this time, the tool spindle axis will intersect the lens blank support spindle axis.

The preferred embodiment of my invention is illustrated in the accompanying drawings wherein similar characters of reference designate corresponding parts and wherein:

Figure 6 is a vertical sectional view taken along line 6—6 of Figure 5.

Figure 7 is a detail in perspective of a portion of the mechanism shown in Figures 5 and 6.

Figure 8 is a perspective view of my machine, the supporting base thereof not being shown.

Figure 9 is a perspective view of a rough lens blank.

Figure 10 is a similar view of the lens blank after the circular segment and the surrounding major area are formed thereon.

Figure 11 is a similar view but illustrating a part of the circular segment removed to form a flat-top segment.

Figures 12 and 13 are diagrammatic views illustrating successive positions of the cam-controlled mechanism which controls movement of the abrading tool relative to the lens blank holder.

Figure 14 is a diagrammatic view illustrating the movement of the tool on the lens blank.

Figure 15 is a diagrammatic view illustrating the shape of the cam which controls the tool movement.

Figures 16 and 17 are diagrammatic views illustrating the use of different size wedges in the control mechanism in working on blanks of different main curvatures.

Figure 1:
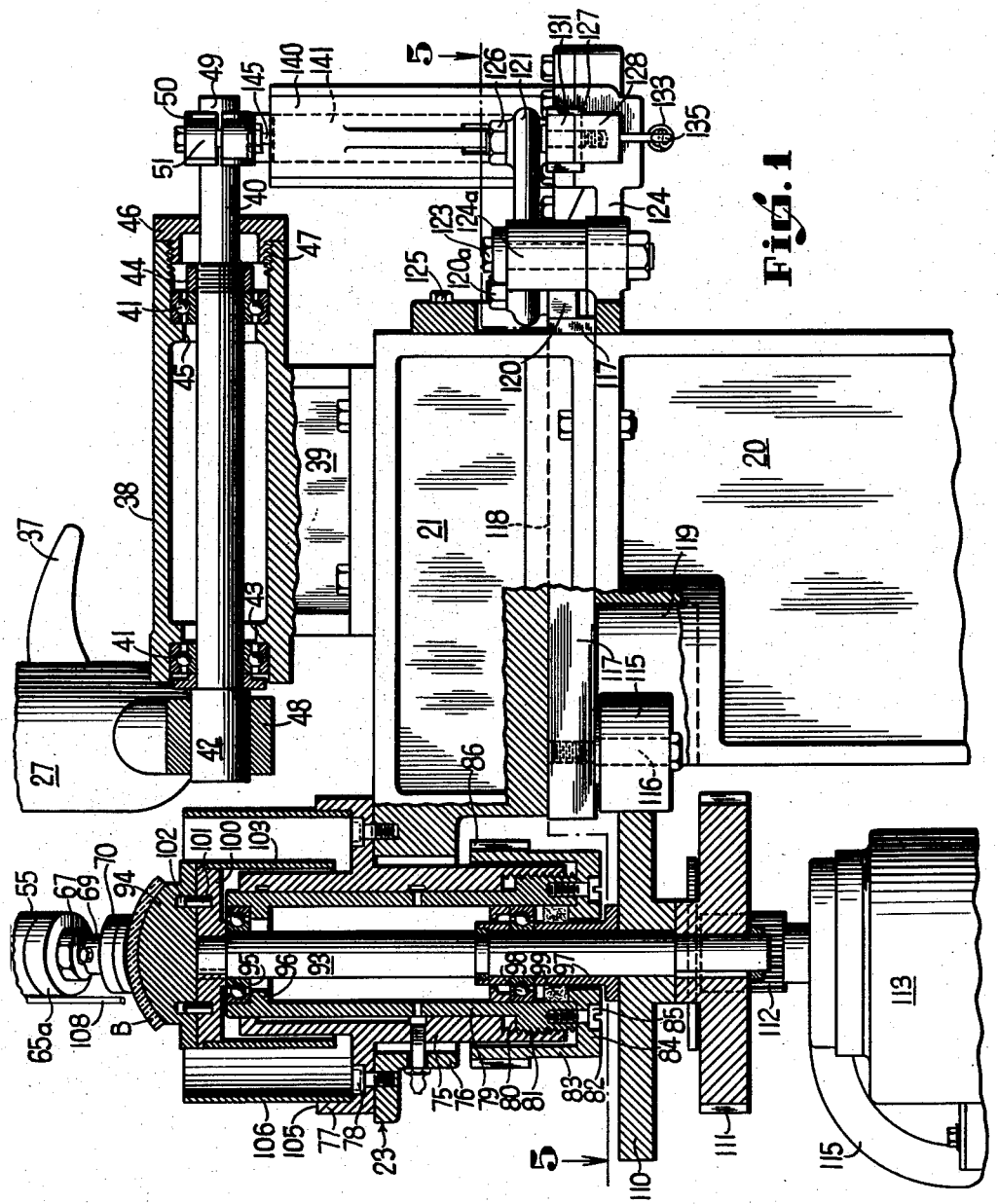
Figure 1 is a view in side elevation and vertical section illustrating my machine with the exception of the upper extremity thereof.

With reference to the drawings, I have illustrated in Figures 9 to 11 steps which may be followed in the formation of a lens blank with a flat-top segment. The lens blank B shown in Figure 9 is a rough blank of concavo-convex form. This blank B is ground on suitable machines to form a centrally disposed circular segment S and a surrounding major area M. The area S is preferably polished but the area M is ground but unpolished. The surfaces of the areas S and M are formed on the convex side of the blank but may be formed on the concave side. The curvature of the surface of area M is usually such that this area is suitable for the distance vision portion of the finished lens. On the other hand, the curvature of the surface of the segment S is usually selected so that such area can serve as the reading vision portion. Thus, the surface of area M is of different radius of curvature than that of the segment S. The segment S, as shown, is of circular outline, the two surfaces merging along the line L. The machine of my invention is adapted to remove a certain predetermined area of the circular segment and form a non-circular segment. If the area indicated by the dotted lines in Figure 11 is removed, a flat-top segment F is produced which will be bounded by the lines in Figure 11 is removed, a flat-top segment F is produced which will be bounded by the line L, preferably through an extent greater than a semicircle, and will have a top edge T extending straight across the top of the segment. Due to the difference in curvature between the surfaces S and M, when the indicated area of the segment S is removed, a shoulder will be formed along the straight top line T. It will be noted from Figure 14, that the boundary line T is connected to the boundary line L by short arcs A. It is to be understood, however, that my machine is not necessarily limited to the formation of this particular shape of segment but may form other non-circular segments. However, my machine is especially suitable for forming flat top segments and this is important since lenses with this type of segment are in great demand at the present time.

The machine of my invention is illustrated generally in Figure 8. It comprises a supporting base 20 which may be of any suitable rigid construction and of any suitable height. The base 20 supports on its upper end a frame section 21 which carries most of the mechanism of my machine. This mechanism comprises mainly a tool unit 22, a lens blank supporting unit 23, and cam mechanism 24 which serves to move the unit 22 relative to the unit 23 as will later appear.

The unit 22 is illustrated best in Figures 2, 3, 4 and 8. The unit is supported by means of a sleeve 25 which is formed on the outer end of a supporting arm 26. The arm 26 is curved rearwardly and downwardly, as indicated, and has a second sleeve 27 formed on its opposite end which serves as a pivot sleeve. This sleeve 27 is mounted for rocking movement on a trunnion 28 which is provided with shoulders 28a at each end of the sleeve to preclude relative axial movement. The axis of trunnion 28 extends transversely relative to the axis of the sleeve 25. This trunnion 28 is rigidly carried by an L-shaped arm 29 which is in substantially the same plane as the axis of trunnion 28. The sleeve 25 of the tool unit 22 will swing in a plane substantially perpendicular to the plane of the axis of the trunnion 28, since the arm 26 can rock about such trunnion. The upstanding portion of the L-shaped arm 29 is provided at its upper extremity with a stop screw 30 which is threaded rearwardly therethrough, as shown best in Figure 3, and which is locked in adjusted position by a lock nut 31. The rear end of the screw 30 is adapted to contact with a stop block 32 which is secured on the curved rear side of the arm 26 by means of a clamping bolt 33 passing through a lug 34 on the rear surface of the curved arm 26. When the arm 26 is swung forwardly about trunnion 28, the block 32 will contact the stop pin 30 and limit such forward movement. When this contact is made, a circuit to a signal light 35 is grounded, the light being connected to pin 30 by means of a wire 36. The signal light is provided for a purpose which will be described later. Rearward swinging movement of the arm 26 about trunnion 28 is limited by means of a stop finger 37 formed on the rear and lower edge of the curved arm 26. This stop finger will contact with a bearing sleeve 38, as shown by the dotted lines in Figure 4.

The sleeve 38 is formed as a part of a frame section 39 which is bolted to the top surface of the frame section 21. This sleeve has rotatably mounted therein a rock shaft 40 which extends from opposite ends thereof. The rock shaft, as shown in Figure 1, is rotatably carried within the sleeve 38 by anti-friction bearings 41 disposed adjacent opposite ends thereof. The forwardly extending end 42 of the shaft 40 is slightly enlarged and provides a shoulder which bears against the forward bearing 41 and holds it in place against an annular shoulder 43 within the sleeve. The opposite end of the shaft has a collar 44 threaded thereon which bears against the rear bearing 41 and holds it against an annular shoulder 45 formed within the sleeve 38. A cap 46 has a flange 47 threaded into the rear end of sleeve 38 and serves to close such end of the sleeve. The forward extending end of the shaft 40 has the L-shaped arm 29 clamped thereto by means of a clamp 48 formed at the end of the portion of the arm 29 which is parallel to sleeve 27. The arm is clamped in fixed position on the end of the shaft 40 by the clamp 48, preferably so that the upstanding part of the arm is tilted laterally to the left, as shown best in Figure 2. The angular position of arm 29 about shaft 40 is dependent upon the base curve of the lens blank to be worked upon and, as will later appear, is adjusted so that the axis of the tool spindle is normal to the curve of the lens blank. The rear extending portion 49 of the rock shaft 40 has a rocker arm 50 clamped thereto by means of a clamp 51 formed as a part of the arm. This arm 50 extends laterally at right angles to the shaft 40 and, as will later appear, is used for rocking the shaft 40 about its axis within the sleeve 38.

The supporting sleeve 25 of the tool unit carries the tool spindle housing 55 which is in the form of a sleeve disposed within the sleeve 25 and slidably adjustable therein. The upper end of the sleeve 55 is provided with a flange 56 to which a tool spindle driving motor 57 is bolted. This motor 57 may be of any suitable type, either fluid or electric, but is preferably of a slow speed type and of such a nature that the speed thereof can be varied readily inasmuch as it is desirable to drive the forming tool at a low speed. The sleeve or housing 55 is adjustable axially within the sleeve 25 by means of a screw 58 which has its upper end anchored to the flange 56 at 59 and extends downwardly along sleeve 25. This screw 58 passes through a lug 60 formed on the exterior of the sleeve 25 and which is engaged on opposite sides by adjusting nuts 61 mounted on the screw. Adjusting the nuts 61 properly, will cause the sleeve 55 to move axially relative to sleeve 25.

The tool-carrying spindle 62 is disposed within the sleeve 55 (Figure 2) and is preferably an extension of the drive shaft of the motor 57. A packing gland 62a is provided at the upper end of sleeve 55 around the shaft 62. The lower end of the shaft is reduced at 63 and is disposed within an anti-friction bearing 64 and a spacer sleeve 65 disposed within the lower end of the sleeve 55. The bearing 64 is held in position by means of a collar 66 threaded into the lower extremity of sleeve 55. A nut 67 threaded on the reduced portion 63 of the spindle below the lower end of sleeve 55 serves to keep the spacer 65 in position within the sleeve. The spacer 65 has a cover portion 65a which closes the lower end of sleeve 55. The extreme lower end 68 of the spindle is further reduced so that it fits into the receiving socket 69 of an abrading tool 70. This tool is preferably of the diamond wheel type and is fixed to the end 68 of the spindle by means of a set screw 71. Obviously, the diamond wheel can be removed and replaced readily. The spindle 62 and wheel 70 carried thereby will be moved vertically with the sleeve 55 whenever it is axially adjusted within the sleeve 25.

The lens blank supporting unit 23 is illustrated best in Figures 1 to 5 and 8. It is supported at the forward end of the frame section 21 and is vertically disposed, extending above and below such frame section. This unit is rigidly supported in fixed position on frame section 21 by means of a vertical sleeve 75 which fits into a collar portion 76 formed at the forward end of the frame section 21 integral therewith. The sleeve 75 has a peripheral flange 77, intermediate its upper and lower ends, which rests on the collar portion 76 and is bolted thereto by means of bolts 78.

Disposed for vertical adjustment within the sleeve 75 is a spindle supporting sleeve 79. This sleeve has an enlarged lower end 80 which is threaded into a socket 81 formed within the lower end of the sleeve 75. A cap 82 has an upstanding annular flange 83 which extends over the lower end of the sleeve 75 in surrounding but spaced relationship thereto. The inwardly extending flange 84 in the lower end of this cap is bolted by bolts 85 to the extreme lower edge of the enlarged portion 80 of the sleeve 79.

At its upper end, the exterior of the flange 83 has a worm gear 86 formed thereon. This worm gear, as shown best in Figures 2 to 4 and 8 has a worm 87a meshing therewith. The worm 87a is carried by a shaft 87 which is rotatably mounted in a bearing 88a that is formed on the lower end of a bracket 88 (Figures 4 and 8) that is bolted by bolts 89 to the side of the collar portion 76 of frame section 21 from which it depends. The opposite ends of the worm shaft 87 extend from the bearing 88a (Figure 8) and the forward end has a handle 90 keyed thereon by means of which it may be rotated while its rear end has a nut 91 thereon which keeps the worm in axial position on the shaft. It will be apparent that rotation of the handle 90 will rotate cap 82 together with sleeve 79 causing it to move axially relative to sleeve 75 due to the threaded connection between the two sleeves provided between enlarged portion 80 of sleeve 79 and socket 81 of sleeve 75. Thus, the sleeve 79 can be raised or lowered merely by operating handle 90 and will be held in adjusted position.

The sleeve 79 rotatably supports the spindle 93 which supports on its upper end the lens blank carrier 94. The spindle 93 is rotatably supported within the sleeve 79 by anti-friction bearing 95 at its upper end which fits within the sleeve and rests on an annular shoulder 96 thereon. The lower end of the spindle 93 is disposed within a spacer sleeve 97 which is disposed within an opening in the cap 82 and extends up into the sleeve 79. The upper end of this spacer 97 supports an anti-friction bearing 98 which is disposed between the sleeve 79 and spindle 93. Between the cap 82 and bearing 98, packing 99 is preferably provided.

The upper end of the spindle 93 has the supporting disc 100 keyed thereon. The flat lower surface of a lens carrier 94 will rest on the upper surface of this disc. The disc carries a pair of upstanding dowel pins 101 which cooperate with sockets 102 in the carrier, the dowel pins being different from each other and being in a plane which corresponds to the axis of spindle 93, so that the lens blank carrier will always be in a predetermined position on the supporting disc 100. This arrangement permits removal of the lens blank carrier 94 and replacement of it in identical angular relationship to spindle 93 or the spindle of an identical machine. Obviously, the lens blank B will be cemented to the upper surface of carrier 94 in the usual manner, such as by pitch. It will be apparent that adjustment of sleeve 79 vertically by turning handle 90 will raise or lower the spindle 93 and the lens blank carrier 94 supported thereby. The disc 100 is provided with a depending skirt 103 which extends down over the upper end of sleeve 75, regardless of the vertical position of spindle supporting sleeve 79, to preclude abrasive from reaching the spindle bearings.

Figure 2:
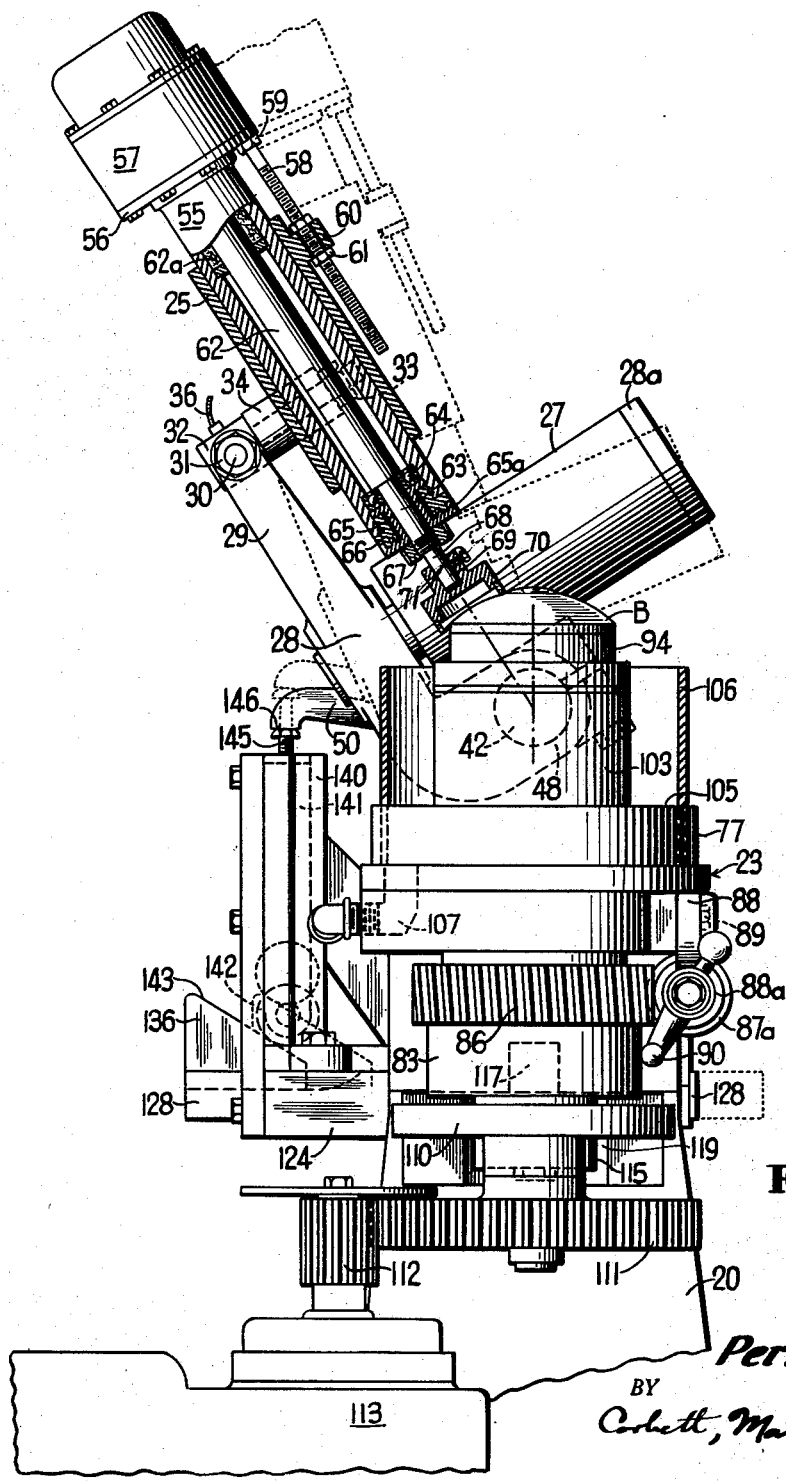
Figure 2 is a front elevational view with part of the tool spindle housing broken away for purpose of illustration.
Figure 3:
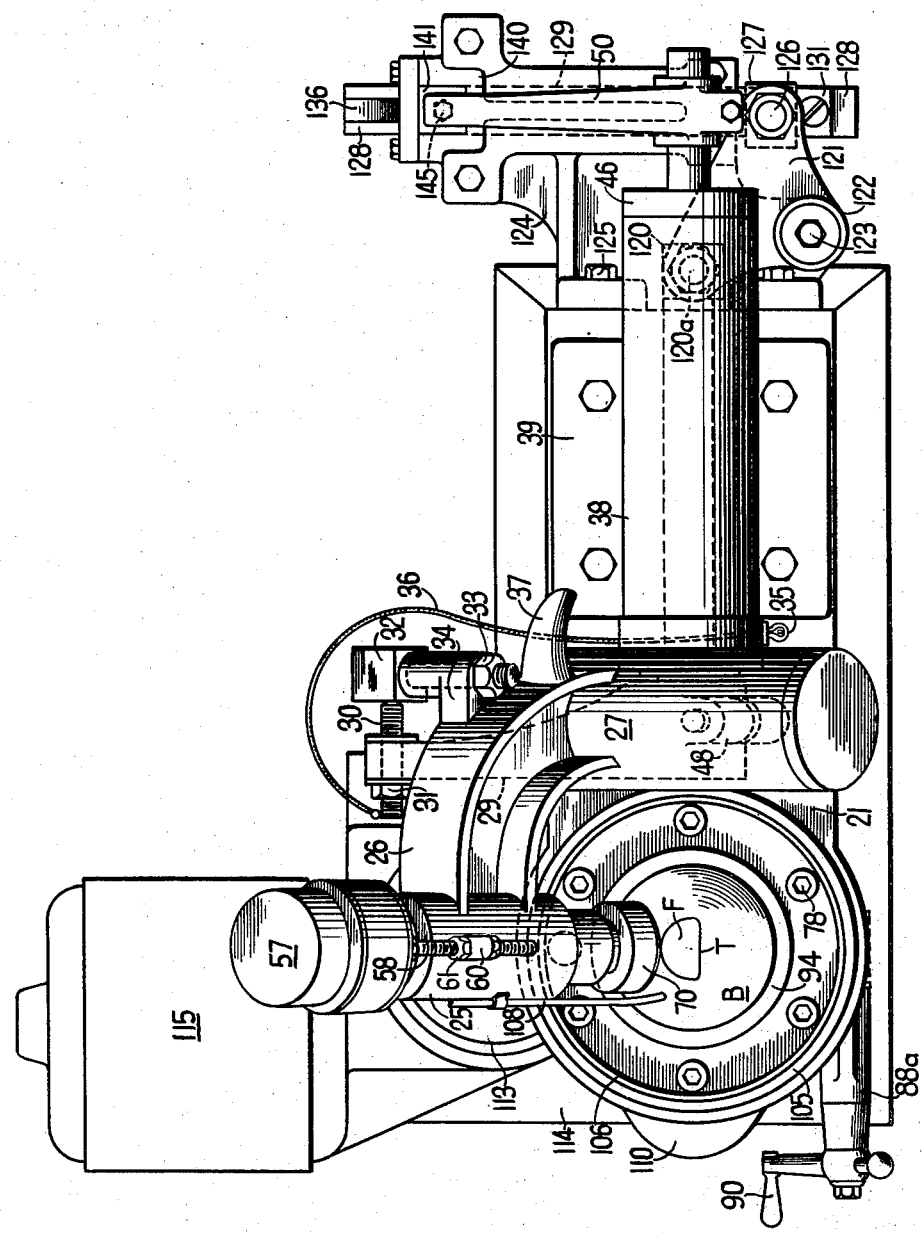
Figure 3 is a plan view of my machine.
Figure 4:
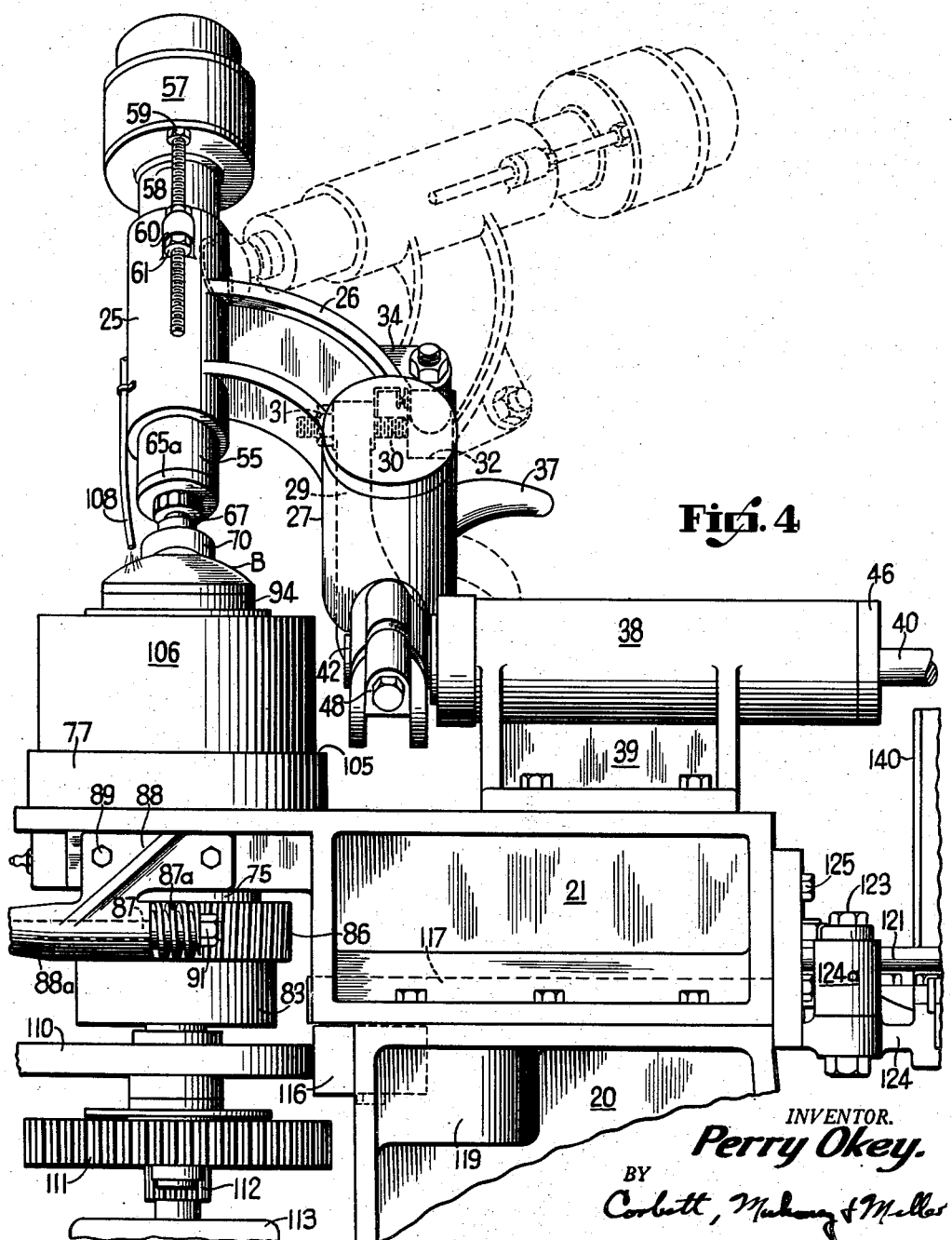
Figure 4 is a side elevational view of my machine, illustrating the inoperative position of the tool spindle and associated parts by dotted lines.
Figure 5:
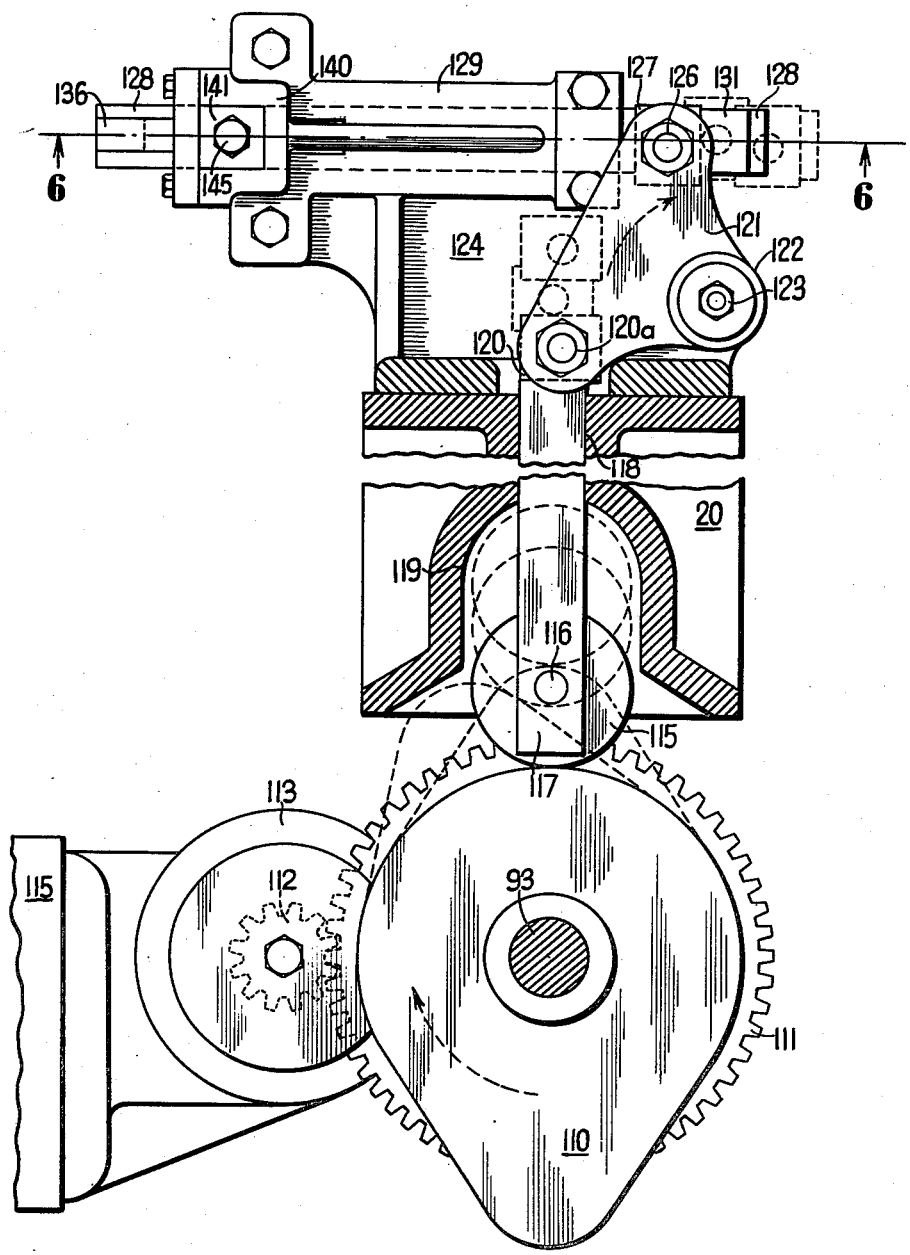
Figure 5 is a horizontal sectional view taken along line 5—5 of Figure 1 illustrating the cam and part of the mechanism actuated thereby for controlling movement of the abrading tool relative to the lens blank support.

It will be noted that the flange 77 on sleeve 75 is provided with an upstanding lip 105 within which is disposed an annular shield 106 which cooperates to form an abrasive-receiving cup. Furthermore, as shown in Figure 2, a drain 107 leads downwardly through the flange 77 and collar 76 to a suitable coolant tank (not shown). A pump (not shown) withdraws the liquid from the tank and forces it through a nozzle 108 (Figure 4) which is attached to the side of sleeve 25 and directs it onto the surface of the blank B.

It will be noted best from Figure 1 that a cam 110 is supported on the spindle 93 directly below the cap 82. This cam is keyed on the spindle for rotation therewith and the lower end of bushing 97 rests thereon. The cam 110 rests on the driving gear 111 which is also keyed on the lower end of spindle 93. This gear 111 meshes with a vertically disposed elongated pinion 112 which is keyed on the upstanding drive shaft of a gear unit 113. This gear unit 113 (Figure 8) is supported on a shelf 114 extending from the base 20. Associated with the gear unit 113 and serving to drive it, is the variable speed motor 115.

Thus, the spindle 93 is independently driven. The drive to the spindle will be effective regardless of the vertical position to which the spindle is adjusted by means of the handle 90. The gear 111 will be moved vertically with the spindle but since the pinion 112 is elongated, the gear will continue to mesh therewith. The cam 110 will always be in position on the spindle 93 and will always rotate therewith. Consequently, the cam will always be in fixed relationship with the lens blank carrier 94 and the lens blank supported thereon.

The cam 110 forms a part of the control mechanism 124 which serves to swing the tool supporting spindle 62 and tool 70 carried thereby about the axis of the shaft 40. The cam may be of any suitable outline to accomplish the proper movement to change the shape of the segment S (Figure 10) to a preselected different outline. If the segment is to be made a flat top segment like that shown at F in Figure 11, the cam will be of the approximate shape shown in Figure 15.

The cam controlled mechanism includes the cam follower or roller 115 (Figures 1 and 5) which is carried by a pin 116 depending from the forward end of bar 117. The roller 115 is of considerable vertical extent so that it will engage the edge of cam 110 regardless of the vertical position of the cam which varies with the vertical adjustment of the spindle 93. The bar 117 is, as shown best in Figures 1, 4 and 5, slidably mounted in a guideway 118 which is formed at the lower side of frame section 21 and extends from the forward end thereof to the rear end thereof. Below the forward end of frame section 21 in the upper end of the base 20, a recess 119 is provided within which the roller 115 can move when the bar 117 slides back and forth. The rear end of bar 117 which projects from guide 118 (Figure 5) contacts a block 120 which is pivoted at 120a to one corner of a horizontal substantially triangular link plate 121. The end of bar 117 can slide transversely on block 120 as indicated by the arrow in Figure 7. The plate 121 is provided with a vertical pivot sleeve 122 at another corner through which a pivot bolt 123 is passed downwardly and on through a bearing 124a in a supporting bracket 124. This bracket 124 is provided with an upstanding part at its forward edge that is bolted by bolts 125 (Figures 1, 3 and 4) to the rear end of the frame section 21. The remaining corner of plate 121 is pivoted by pin 126 to the block 127 supported in the adjacent end of a slide bar 128 which is shown in Figures 1 to 8.

The bar 128 is mounted for reciprocation transversely at right angles to the bar 117. It is disposed in a guideway 129 (Figures 1, 3 and 7) which is formed at the rear edge of the bracket 124. The pivot block 127 is disposed adjacent the upper surface of slide bar 128 for transverse movement relative to the bar so that the pivot pin 126 is transversely movable also. A contacting surface for the block is formed on the end of the bar which projects from guideway 129 by means of a thrust block 131 which engages one vertical surface of the block 127. When bar 117 is moved rearwardly by cam 110, the plate 121 is rocked about pivot 123 and this pulls the rod 128 from guideway 129 to the right (Figures 5 and 6), the plate 121 at the same time rocking about pivot 126 which is carried by block 127 that will move slightly forwardly transversely of bar 128. The flat contacting surfaces of block 127 and block 131 will take the thrust and will slide relative to each other. A spring 133 tends to keep the bar 128 to the left and keep plate 121 in such a position that block 120 contacts the rear end of bar 117 and the bar will be urged forwardly to keep roller 115 in engagement with cam 110. This spring 133 is a tension spring and is anchored to bracket 124 by an eye bolt 134 and to the right hand end of bar 128 by an eye bolt 135.

The left hand end of the bar 128 projects from guideway 129 and has resting on its upper surface the lower flat edge of a wedge member 136. This member 136 is set in a longitudinal groove 137 in the upper surface of bar 128 and is bolted in position therein by removable screw bolts 138 which are passed upwardly through openings in the bar and have their upper ends threaded into sockets in wedge member 136.

The bracket 124 also has at its left hand side a vertically disposed angular guideway 140 formed thereon which is in the same vertical plane as guideway 129 and is perpendicular thereto. This guideway 140 receives a vertically slidable plunger 141. The lower end of this plunger carries a roller 142 which is in engagement with the upper inclined edge 143 of the wedge member 136. A portion of the lower end of the guideway 140 is cut away to provide a vertical slot 144 in which the roller 142 can move vertically. The upper end of the plunger 141 is provided with a screw 145 threaded thereinto, the rounded head of the screw being in contact with a flat surface 146 of the rocker arm 50 which is carried by the rock shaft 40 that rocks the tool unit supporting arm 26. The spring 133 tends to hold the bar 128 in the position shown in Figure 6 where roller 142 will be adjacent the lower end of the inclined surface 143 of wedge 136. The wedge 136 may be readily removed and be replaced with a wedge of different inclination. The screw 145 may be adjusted as necessary so that it will contact with the flat under surface 146 of the rocker arm 50, with the rocker arm in substantially horizontal position and roller 142 in contact with the lower end of inclined surface 143 of the selected wedge 136.

It will be apparent from the above that the axis of the vertically disposed lens blank supporting spindle 93, the axis of the horizontally disposed rock shaft 40, and the axis of the tool-carrying spindle 62, intersect at a point located along a continuation of the axis of the shaft 40, as indicated best in Figure 2, and this relationship is maintained at all times. The axis of the vertically disposed lens blank supporting spindle 93 and the axis of the horizontally disposed rock shaft 40 are in the same vertical plane at all times which plane passes through the axis of shaft 40. Furthermore, when the segment-shaping operation is completed on my machine, the axis of the tool-carrying spindle 62 will be in the same vertical plane as the axis of the lens blank carrying spindle 93 which plane is perpendicular to shaft 40 and the above-mentioned vertical plane. However, when the shaping operation starts, the axis of the spindle 62 will be slightly out of the said vertical plane of the axis of the spindle 93, due to the fact that the tool spindle supporting arm 26 is rocked upwardly and rearwardly slightly by vertical adjustment of the spindle 93 and lens blank carried thereby to the extent necessary to permit removal of the segment material by the forming tool 70 to the proper depth.

In using this machine, the lens blank B carried by the carrier 94 is positioned on the supporting disc 100. The lens blank will at this time be in the condition illustrated in Figure 10, that is, with the circular segment S formed thereon and with the surrounding major surface M formed thereon. The tool spindle 62 will be swung downwardly by swinging arm 26 about trunion 28 so as to move tool 70 into operative position so that the lens blank can be moved up into contact therewith. The tool-supporting spindle 62 will be adjusted axially, by adjusting sleeve 55 axially in the sleeve 25, to space the edge of tool 70 from the axis of shaft 40, about which it rocks, a distance corresponding to the radius of the major surface M of the lens blank B supported on the machine, as shown in Figures 12 and 13. The handle 90 will now be rotated to vertically adjust the supported lens blank to bring the blank up into contact with tool 70. As indicated above, the lens blank will be adjusted upwardly to such an extent that the tool spindle will rock upwardly about the axis of trunnion 28 to the slight extent necessary to permit the tool to subsequently move downwardly and remove the material of the circular segment to the proper depth. Before the machine is started, the tool unit supporting arm 29 is adjusted laterally about the axis of the shaft 40 so that the tool spindle axis 62 will extend angularly to the left (Figure 2) in order that the tool spindle axis will be substantially normal to the arc of curvature of the major surface M extending from the segment to the outer edge of the lens blank. As previously indicated, the axis of spindle 62 will intersect the axis of shaft 40 which will be at the center of curvature of the major surface M of the lens blank B.

The motor 115 is now controlled to drive the lens blank carrier spindle 93 at a suitable speed and the motor 57 is now controlled to drive the tool-carrying spindle 62 at a suitable speed. The spindle 62 is preferably driven at a faster rate than the spindle 93. Driving the spindle 93 also results in rotating the cam 110. This cam will serve to move the slide 117 since it engages the roller 115 carried thereby. Movement of this slide rocks the plate 121 and moves the slide 128 which moves the wedge 136, causing it to move the plunger 141 vertically and rock the arm 50. Rocking the arm 50 rocks the shaft 40 which carries the tool unit 22. This, in turn, rocks the tool spindle 62 and moves the tool 70 towards and from the center of the lens blank at properly timed intervals. The weight of the tool unit will cause it to move downwardly and forwardly about the axis of trunnion 28 into the material of the segment S and eventually bring it to the level of the area M at which time pin 30 will contact block 32 and the light 35 will go on indicating that the operation on the blank is completed.

The action of the cam 110 in controlling rocking of the tool spindle axis 62 is illustrated in Figures 12 to 15. To obtain the flat top segment, the cam 110 is of approximately the shape illustrated having a substantially circular end 110a, which is concentric with the axis of shaft 93, and a tapering end 110b, which is eccentric with the axis of the shaft. The spring 133 pulls the slide 128 to the left, as previously indicated, and at this time the tool 70 will be rocked to a position away from the center of the lens blank due to the fact that the roller 142 on plunger 141 will be at the lower end of the inclined surface 143 of the wedge, as shown in Figure 12. At this time the cam follower roller 115 will be in contact with the circular portion 110a of the cam. As the cam rotates, the eccentric portion 110b engages the roller 115 and gradually moves the slide 128 to the right, the slide being moved to the right to the maximum extent when the roller 115 is at the point of the eccentric cam portion 110b, as shown in Figure 13. Also, at this time the roller 142 will be at the highest point of the wedge 136. Moving the wedge 136 to the right in this manner, rocks the tool 70 inwardly, as shown in Figure 13, so as to remove a portion of the circular segments of the rotating lens blank.

A comparison of Figures 14 and 15 illustrates how the shape of the circular segments is changed in accordance with rotation of the cam 110. As long as the roller 115 is in contact with the concentric portion 110a of the cam, the tool 70 follows the circular outline L of the segment S. As soon as the eccentric portion 110b of the cam engages roller 115, the tool leaves the line L and starts to turn inwardly following the short arc A first and then traveling straight across the lens blank segment along straight line T until the concentric part 110a of the cam again engages the roller when the tool will travel around the other arc A and again follow the line L. A comparison of the angular lines on the cam of Figure 15 with those on the blank of Figure 14 will indicate the action of the cam in its progressive rotation in controlling the progressive movement of the tool about the segment S.

The segment shaping operation will continue until the tool 70 has removed the predetermined portion of the segment to a depth corresponding to that of the surface M. At this time, the pin 30 will engage the block 32 and limit further downward movement of the tool 70, which will prevent further removal of material from the lens blank. Also, at this time the axis of the tool spindle 62 will be in the same vertical plane as the axis of the lens blank carrying spindle 93. The polishing of the surface surrounding the flat-top segment may be accomplished on this machine with a suitable polishing tool, which will replace the diamond wheel but will be of the same size and shape, or may take place on another identical machine. Even if the lens blank carrier 94 is removed from this machine and placed on another identical machine, the cam 110 and the lens blank B will be in identical relationship. The cam is carried by the rigid supporting spindle 93 and is always in a fixed position thereon. Although the cam is on the lens blank carrier spindle, it controls rocking of the tool spindle accurately through the medium of the slides 117 and 128 and associated parts. Thus, even though the cam 110 is located remote from the tool spindle 62, it accurately controls rocking movement thereof both as to angular extent and timing.

If the machine is to operate on lens blanks of different base curvature, it is adjusted in the manner illustrated in Figures 16 and 17. From these latter figures, it will be seen that for each radius of lens curvature a wedge of proper inclination must be used in order that the same amount of glass will be cut from the circular segment. To set the machine to generate a certain radius the tool 70 is set in the correct position by adjusting sleeve 55 in sleeve 25 so that the tool is spaced from the axis of the rocker shaft 40 by an amount equal to the desired radius, the proper wedge is mounted, the lens blank is then adjusted vertically to remove the desired amount of glass.

Since the cam 110 is carried by the lens blank supporting spindle 93, it is rigidly supported and will, therefore, be very accurate in controlling the rocking movement of the tool 70. Because the cam merely rotates, since it is carried by the fixed lens blank carrying unit 23 of the machine, and does not move or swing bodily, the edge of the cam will always contact flatly with the cam following roller 115. Also, the cam following roller 115 does not tilt but merely moves bodily substantially in the horizontal plane of the cam and this also aids to ensure flat contact of the face of the roller 115 with the edge of the cam 110 so as to obtain extreme accuracy in moving tool 70. Furthermore, although the cam is supported remotely from the rocking tool and, therefore, can be more suitably supported, it accurately controls movement of the tool relative to the lens blank because of the nature of the intermediate slide mechanism. It will be noted also that even though the lens blank is adjusted vertically by means of handle 90, the relative positions of the lens blank and cam will not be varied since this merely moves the sleeve 79 vertically without rotating spindle 93 and, furthermore, both the cam and lens blank are non-rotatably carried by the spindle.

It will be apparent from the above description that my machine will operate upon a previously formed lens blank having a segment of one outline so as to produce a segment of a different outline. The exposed area produced by removing a portion of the area of the original segment will be brought into exact continuity with the surrounding area or major area of the lens blank without damage to the surface thereof. Although my machine is particularly useful for changing a circular segment to a flat-top segment, it is not necessarily limited thereto. Because the tool is accurately controlled in its movement relative to the lens blank and is positively held without vibration in a predetermined path on the lens blank, the segment will merge with the surrounding area along the circular line and the shoulder along the flat-top will be free of defects which might cause aberrations along said shoulder in the finished lens. The machine can be set with extreme accuracy so that it will remove only a predetermined area of the segment and only to a level where it forms a continuity of the major surface of the lens blank. The machine can be quickly and easily adjusted for operation upon various series of lens blanks of different major curvatures. These adjustments ensure that only a certain predetermined area of the segment will be removed and only to a depth corresponding to that of the major area regardless of the major curvature of the lens blank.

Various other advantages will be apparent.

Having thus described my invention, what I claim is:

1. A machine for use in producing one-piece multifocal ophthalmic lens blanks comprising a supporting structure, a lens blank supporting unit and a forming tool-supporting unit disposed on said supporting structure, said lens blank-supporting unit including a rotatable spindle, means for supporting said spindle in fixed vertical position, said tool-supporting unit including a rotatable spindle, means for supporting said tool spindle with its axis located substantially in the same vertical plane as said blank spindle, said blank spindle carrying a blank-supporting means on its upper end in fixed position thereon, said tool spindle being disposed above the blank spindle and having a forming tool on its lower end which engages the upper surface of a blank carried by said blank-supporting means, an arm supporting said tool spindle, said arm being carried by a horizontally disposed shaft which is mounted on said supporting structure for rocking movement, said shaft being supported at right angles to said vertical plane in which the tool spindle and lens blank spindle are located and in which said tool spindle will rock, a rocker arm fixed to said shaft, means for rocking said rocker arm, said means including a cam carried by said blank spindle in fixed position thereon for rotation therewith about its fixed vertical axis, and control mechanism between said cam and said rocker arm, said mechanism including a horizontally disposed slide carried by said supporting structure, and a cam following roller carried by said slide for bodily movement horizontally only at right angles to said vertical axis and always in engagement with said cam.

2. A machine according to claim 1 wherein said slide is disposed in a vertical plane which will intersect with the vertical plane of said blank spindle and wherein said cam and slide are disposed at a level below said horizontal rocker shaft, and wherein said control mechanism includes an additional slide disposed at right angles to said first slide and in substantially the same horizontal plane, connecting means between the first and second slides to cause reciprocating movement of the second slide in response to reciprocating movement of the first slide produced by rotation of the cam, and means for rocking said rocker arm in response to movement of said second slide.

3. A machine according to claim 2 wherein said rocker arm extends at right angles to the shaft and is normally in horizontal position and wherein said last-named means comprises a vertically movable plunger engaging said arm, said second-named slide carrying a wedge member which engages the lower end of said plunger.

4. A machine according to claim 3 wherein said wedge member is removable so that it can be replaced with a wedge member of different inclinatoin to vary the extent of movement of said plunger.

5. A machine according to claim 3 wherein a spring is connected to said second-named slide for normally urging it to a position where the plunger contacts the lower end of the wedge.

6. A machine according to claim 5 wherein the connecting means between the first and second slides comprises a plate pivoted to said supporting structure and pivoted to the adjacent ends of said first and second slides.

7. A machine according to claim 6 wherein said plate is pivoted by a fixed pivot to the first slide and by a floating pivot to the second slide.

8. A machine according to claim 1 wherein said means for supporting said tool spindle includes means for axially adjusting said spindle, and said means for supporting the blank spindle includes means for axially adjusting said sipndle.

9. A machine according to claim 8 wherein said tool spondle supporting arm is mounted on said horizontal rock shaft by means which permits adjustment of said arm to various angular positions about said shaft.

10. A machine according to claim 9 wherein said arm is composed of two sections, one of which directly supports the tool spindle, said last-named section being pivoted to the other section by a pivot disposed at right angles to said rocker shaft.

11. A machine according to claim 10 wherein stop means is carried by the two arm sections for limiting the extent of downward swinging movement of the section which directly supports the tool spindle.

12. A machine according to claim 11 wherein a signaling circuit is provided for indicating when the tool spindle reaches its lowermost position, said signaling circuit being controlled by said stop means to which it is connected.

13. A machine according to claim 1 wherein the tool spindle is supported for rotation in a sleeve by suitable bearings, said sleeve being supported on said arm through the medium of a second sleeve carried by the arm, and screw means connected with both of said sleeves for adjusting the first sleeve axially within the second sleeve.

14. A machine according to claim 13 wherein a spindle-driving motor is carried by the first sleeve and is connected to the spindle.

15. A machine according to claim 1 wherein the means for supporting the blank spindle includes a sleeve which supports the spindle by means of suitable bearings, said sleeve being threaded into a fixed sleeve carried by said supporting structure.

16. A machine according to claim 15 including worm and gear means for rotating said first-named sleeve to thread it into and out of second-named sleeve.

17. A machine according to claim 16 wherein the spindle is rotated by means of a driving motor disposed below the lower end thereof and geared thereto, the gearing including a gear keyed to the spindle and a driven pinion engaging said gear and which is vertically disposed parallel to said spindle, said pinion being elongated to permit vertical movement of the gear in accordance with vertical adjustment of the spindle.

18. A machine according to claim 17 wherein the cam which is also carried by said spindle is in engagement with a vertically disposed follower roller which has a vertical base of substantial extent to permit the vertical adjustment of the cam with the spindle.

PERRY OKEY.

REFERENCES CITED

The following references are of record in the file of this patent:

UNITED STATES PATENTS

| Number | Name | Date |
|---|---|---|
| 447,700 | Schulze-Berge | Mar. 3, 1891 |
| 1,051,869 | Eckstein | Feb. 4, 1913 |
| 2,087,687 | Houchin | July 20, 1937 |
| 2,208,527 | Houchin | July 16, 1940 |
| 2,213,958 | Gamble | Sept. 10, 1940 |